W. F. ENGELMAN.
CORN PLANTER.
APPLICATION FILED FEB. 3, 1914.
1,106,373.
Patented Aug. 11, 1914.
2 SHEETS—SHEET 1.
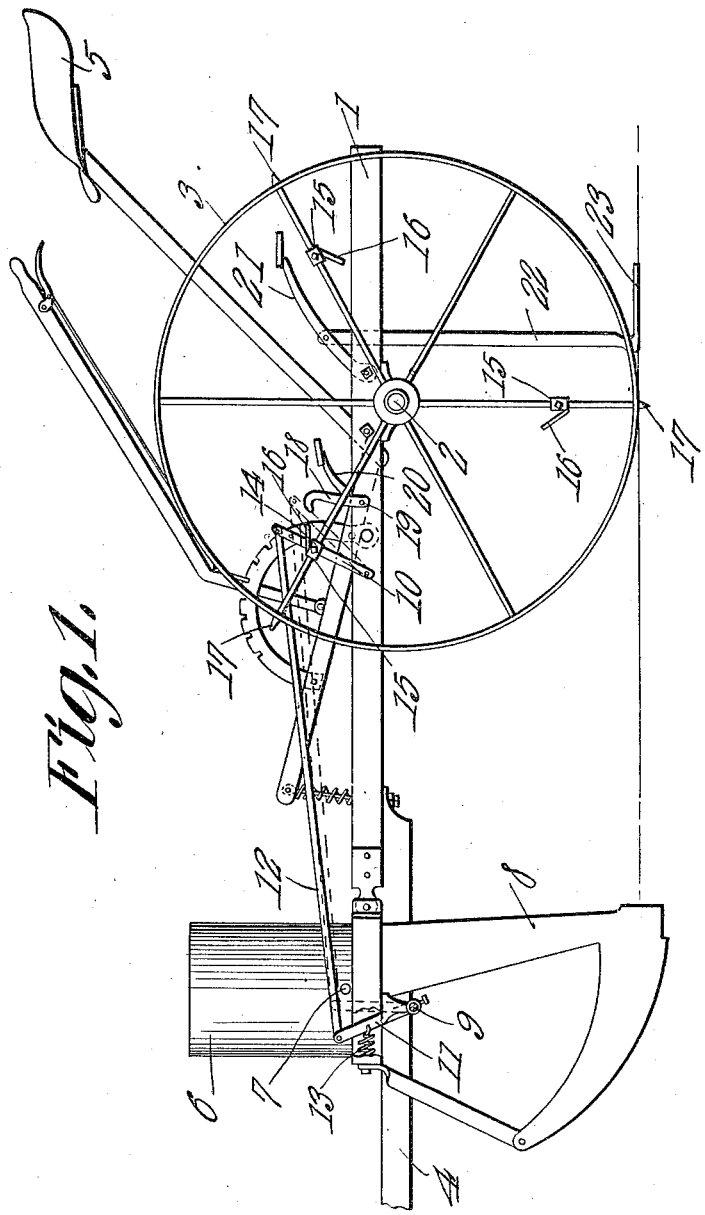
Witnesses
William F. Engelman,
Inventor
by Attorneys

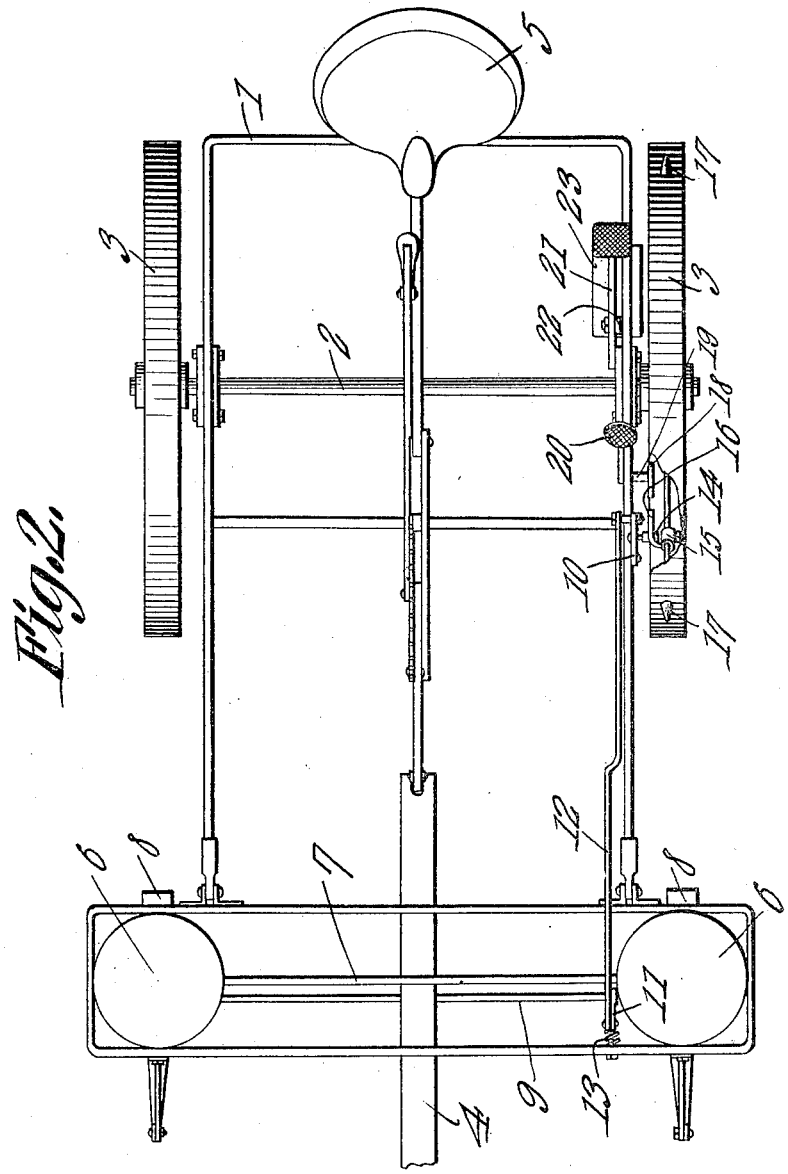

UNITED STATES PATENT OFFICE.

WILLIAM F. ENGELMAN, OF NOKOMIS, ILLINOIS.

CORN-PLANTER.

1,106,373.

Specification of Letters Patent. Patented Aug. 11, 1914.

Application filed February 3, 1914. Serial No. 816,266.

*To all whom it may concern:*

Be it known that I, WILLIAM F. ENGELMAN, a citizen of the United States, residing at Nokomis, in the county of Montgomery and State of Illinois, have invented a new and useful Corn-Planter, of which the following is a specification.

The present invention appertains generally to planters, and aims more particularly to provide a novel and improved wireless check row planter for dropping corn or other seed, and for marking the hills.

It is the object of the present invention to provide a planter embodying a unique means for actuating the seed dropper, and for marking the hills, after the seed has been dropped.

It is another object of the present invention to provide a planter of the nature indicated, embodying means for readily setting the dropping means after the planter has reached the end of one row and has been turned around to start a new row, whereby the seed may be planted in rows in a convenient and ready manner.

A further object of the present invention is to provide novel means for locking the seed dropping mechanism in inoperative position.

It is also within the spirit of the invention to provide a mechanism of the nature indicated, which shall be comparatively simple, and inexpensive in construction, as well as being simple, convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a side elevation of a planter embodying the present improvements, portions being broken away. Fig. 2 is a plan view of the same, portions being broken away.

The planter as illustrated, and which may be taken as typical, embodies a frame 1, the side portions or beams thereof, being mounted upon an axle 2, having the ground wheels 3 at its extremities, a tongue 4 being attached to the front end portion of the frame 1, whereby the planter may be drawn over the field by draft animals. A suitable seat 5 is also mounted on the rear end portion of the frame 1. The planter further includes a pair of seed hoppers or boxes 6 mounted on the front end portion of the frame at the sides thereof in advance of the ground wheels, the said hoppers or boxes being provided with the usual seed discharge controlling means connected by an operating shaft 7, the chutes or boots 8 depending from the seed hoppers or receptacles 6 to deliver the released seed to the soil. The usual seed releasing means (not shown) for dropping the seed into the chutes or boots 8, are connected by means of a rock shaft 9 which is adapted to be actuated automatically in the manner as will presently appear.

A lever or arm 10 is fulcrumed or pivoted to one side of the frame 1, adjoining the inner side of one of the ground wheels, and a lever or arm 11 is keyed or attached to the rock shaft 9 for releasing or dropping the seed down the chutes or boots 8, a link or connecting rod 12 having its terminals pivoted to the free ends of the levers or arms 10 and 11. The arm or lever 10 is arranged to be oscillated or tipped by the adjoining ground wheel, and to this end, a roller 14 is carried by the arm or lever 10 intermediate its ends, and projecting outwardly toward the adjoining wheel, while a series of clamps or clips 15 are engaged to certain spokes of the said ground wheel and each has an inwardly offset cam or wiper finger 16 arranged to engage the roller 14 as the ground wheels rotate due to the forward motion of the planter. The clamps or clips 15 are preferably placed upon the spokes so as to be adjusted radially, and preferably have set screws or clamping means for holding them at the proper position, in order that the cam or wiper fingers 16 will properly engage the roller 14 when the machine is in operation. The cam or wiper fingers 16 are disposed obliquely or angularly, and are offset from one side of the corresponding ground wheel to force the roller 14 rearwardly and downwardly, or toward the hub of the said ground wheel, when the said fingers pass over the roller, to thereby swing the arm or lever 10 rearwardly, and to correspondingly swing the arm or lever 11 to oscillate the rock shaft 9. A coiled wire retractile spring 13 is attached to the arm or lever 11 and to the forward end of the frame 1, to return the arm or lever 11 to normal or initial position, after the arm or lever 10 is released. Secured upon the tire or rim of that ground wheel having the cam or wiper fingers 16 are a plurality of marking spuds 17, corresponding in number with the cam or wiper fingers 16, and which are so arranged as to enter the soil over the planted seed or hills to mark or check the same.

In order to lock the lever or arm 10 in inoperative position, to thereby prevent the actuation of the rock shaft, a hook or detent 18 is carried by that side of the frame 1 to which the arm or lever 10 is fulcrumed, the hook or detent 18 being preferably attached to the outer end of the rock shaft 19 journaled through said side of the frame, and having a foot treadle 20 attached to its inner end within convenient reach of the operator seated upon the seat 5. The hook or detent 18 is arranged to engage over the roller 14 when the arm or lever 10 is swung rearwardly and downwardly to such an extent, that the roller 14 is swung beyond the path of the cam or wiper fingers 16, whereby the actuating mechanism will remain idle, when the planter is drawn onto and off the field. The planter is also provided with a jack device, including a treadle or foot piece 21, fulcrumed to that side of the frame 1, having the arm or lever 10 and hook 18, and a thrust bar 22 pivoted at its upper end to the treadle or foot piece 21 and being provided at its lower end with a shoe or foot 23 adapted to rest upon the soil adjoining that ground wheel having the cam fingers 16 and markers 17.

In operation, supposing the hook or detent 18 to be released from the roller 14, the planter or machine being drawn forwardly, will cause the cam or wiper fingers 16 to successively engage and force the roller 14 rearwardly and downwardly, to intermittently actuate the shaft 9 for dropping the seed into the boots or chutes 8, the hills being marked by the marking devices 17. Then, when the planter reaches the end of the row, and when the planter has been turned around, to start a new row, the operator may readily set the actuating mechanism whereby the hills of the new row will aline with the hills of the previously formed rows. This is accomplished by depressing the treadle or foot piece 21, to thereby raise the frame 1 and to carry that ground wheel 3 having the markers 17 and cam fingers 16 above the soil, so that the operator may readily rotate the said ground wheel to properly set the same, in check with the previously formed hills. The frame may then be dropped, by releasing the treadle or foot piece 21 and the planter may then continue its movement over the field, to form the new hills, which, it will be noted, will aline or check with the previously formed hills, as is highly desirable.

When it is desired to lock the mechanism for releasing or discharging the seed, the lever or arm 10 is swung rearwardly, in order that the hook or detent 18 may be engaged over the roller 14 to thereby prevent the cam fingers 16 from engaging the roller 14 to operate the arm or lever 10. Thus, the actuating mechanism may be locked in inoperative position, when the planter is being run onto or off the field, or while it is being turned around at the end of the field. The hook or detent 18 may be readily released, when desired, by depressing the foot piece or treadle 20, as will be obvious.

Particular attention is directed to the fact that it is not necessary for the operator to leave his seat, for setting the actuating mechanism at the beginning of the row of hills, inasmuch as the ground wheel having the markers, may be readily disengaged from the soil, by means of the jacking device carried by the frame.

From the foregoing, taken in connection with the drawings, the other advantages or desirable features of the present improvements will be obvious to those versed in the art, it being noted that the objects aimed at have been carried out satisfactorily.

Having thus described the invention, what is claimed as new is:—

In a planter, a wheel mounted frame, a seed dropper rock shaft carried by the frame, a spring returned arm attached to the said shaft, a lever fulcrumed to the frame adjoining one ground wheel, a link connecting the said arm and lever, a roller carried by the said lever and projecting toward the said ground wheel, clamps carried by certain spokes of the said ground wheel and having oblique cam fingers offset from one side of the wheel and arranged to engage the said roller, and markers disposed upon the tire of the said ground wheel.

In testimony that I claim the foregoing as my own, I have hereto affixed my signature in the presence of two witnesses.

WILLIAM F. ENGELMAN.

Witnesses:
ELMER TRUITT,
EARL MUIR.